US010462255B2

(12) United States Patent
Schissel et al.

(10) Patent No.: US 10,462,255 B2
(45) Date of Patent: Oct. 29, 2019

(54) BRIDGING SKILLS GAP

(71) Applicant: Microsoft Technology Licensing, LLC, Redmond, WA (US)

(72) Inventors: Jason Schissel, Mountain View, CA (US); Utku Ozan Candogan, Durham, NC (US); Kimon Drakopoulos, Sommerville, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 859 days.

(21) Appl. No.: 15/007,034

(22) Filed: Jan. 26, 2016

(65) Prior Publication Data

US 2017/0213179 A1    Jul. 27, 2017

(51) Int. Cl.
| | | |
|---|---|---|
| *G06F 17/30* | (2006.01) | |
| *H04L 29/08* | (2006.01) | |
| *G06Q 10/06* | (2012.01) | |
| *H04L 12/58* | (2006.01) | |
| *G06F 16/901* | (2019.01) | |
| *G06N 5/00* | (2006.01) | |
| *G06F 17/22* | (2006.01) | |
| *G06Q 50/00* | (2012.01) | |
| *G06N 20/10* | (2019.01) | |
| *G06N 7/00* | (2006.01) | |

(52) U.S. Cl.
CPC ........ *H04L 67/306* (2013.01); *G06F 16/9024* (2019.01); *G06F 17/2235* (2013.01); *G06N 5/003* (2013.01); *G06Q 10/063112* (2013.01); *H04L 51/32* (2013.01); *H04L 67/10* (2013.01); *H04L 67/22* (2013.01); *G06N 7/005* (2013.01); *G06N 20/10* (2019.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 9,135,555 | B2 * | 9/2015 | Gandhi | G06N 5/02 |
| 9,794,359 | B1 * | 10/2017 | Lessin | H04L 67/22 |
| 9,798,832 | B1 * | 10/2017 | Lessin | G06F 17/30991 |
| 2013/0114864 | A1 * | 5/2013 | Garcia | H04N 7/173 |
| | | | | 382/118 |
| 2013/0212479 | A1 * | 8/2013 | Willis | G06Q 10/10 |
| | | | | 715/736 |

(Continued)

*Primary Examiner* — Gurkanwaljit Singh
(74) *Attorney, Agent, or Firm* — Schwegman Lundberg & Woessner, P.A.

(57) ABSTRACT

This disclosure provides for a social networking server that helps a member of a social networking service find a bridge between his or her current skill set and skills associated with a job listed on the social networking service. The social networking server forms a skills graph for the members of the social networking service, where nodes of the skills graph correspond to skills possessed by the members. The nodes are collected into pairs, where an edge between a selected pair is established based on a confidence measure that a given member possesses each skill of the selected pair. By traversing a path through the nodes of the skills graph, the social networking service helps a member identify intermediary skills that the member could learn to help bridge a gap between his or her current skill set and skills associated with a job opening.

20 Claims, 10 Drawing Sheets

(56) References Cited

U.S. PATENT DOCUMENTS

| | | | |
|---|---|---|---|
| 2014/0095419 A1* | 4/2014 | Gandhi | G06N 5/02 706/46 |
| 2015/0261742 A1* | 9/2015 | Gandhi | G06N 5/02 704/9 |
| 2018/0004861 A1* | 1/2018 | Lessin | G06F 17/30991 |
| 2018/0054494 A1* | 2/2018 | Lessin | H04L 67/22 |

* cited by examiner

BRIDGING SKILLS GAP

TECHNICAL FIELD

The subject matter disclosed herein generally relates to a system and method for recommending intermediary skills given an initial skill and a desired skill, and in particular, for generating a skills graph, where each node of the skills graph corresponds to a skill, and traversing the skills graph from the initial skill to the desired skill to determine a minimum distance value or maximum distance value path skill, where the path includes intermediary nodes corresponding to intermediary skills for recommendation.

BACKGROUND

An online social networking service provides a platform whereby a member of the social networking service may connect with other members of the social networking service. The social networking service provides a number of services to the member, such as job seeking services, job hosting services, member profile services, job history services, resume building services, and other such services. From interacting with these services, the social networking service stores information provided by members in a corresponding member profile.

Where the social networking service advertises one or more job openings, a job opening may be associated with one or more skills that the associated employer would like the potential employee to have. There may be a number of candidates for the job opening, but none of the potential candidates may have the skills that the employer would like the employee to have for the job opening. In addition, some candidates for the job opening may desire to learn the skills associated with the job opening, but may be unsure as to how they would go about acquiring such skills. Other candidates may also be skilled within their own industry, but would like to transition to another industry or another career via the job associated with the job opening. As there may be little or no direct correlation between the skills currently possessed by these candidates and the skills associated with the job opening, it may be difficult for these candidates to determine which intermediary skills they should acquire or learn to transition from their current skill set to the skills associated with the job opening. Thus, the job opening may remain vacant or unfulfilled as there may be no suitable candidates to fill it. Accordingly, there is a benefit to both employers and job candidates in identifying transitional or intermediary skills.

BRIEF DESCRIPTION OF THE DRAWINGS

Some embodiments are illustrated by way of example and not limitation in the figures of the accompanying drawings.

DETAILED DESCRIPTION

Example methods and systems are directed to automatically generating electronic presentations and, more particularly, to integrating different data architectures to automatically generate an electronic presentation having various metrics obtained from different data sources. The disclosed embodiments include a client-server architecture where a social networking server has access to a social graph of its social networking members. The social networking server includes various modules and engines that facilitate identifying intermediary skills given a set of initial skills and one or more target or desired skills. To identify the intermediary skills, the social networking server initially builds a skills graph where the nodes of the graph are associated with a given skill and edges between the nodes indicate the degree of similarity between skills associated with their corresponding nodes. By finding a path from a node associated with an initial skill to a node associated with a desired or target skill, the social networking server can identify those skills which are intermediary and would help a person with the initial skill gain or achieve the desired skill. The technical benefit of the approach disclosed herein is that it reduces the amount of human effort needed to research and evaluate skills that would help an individual achieve the desired skill.

Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Figure 1:
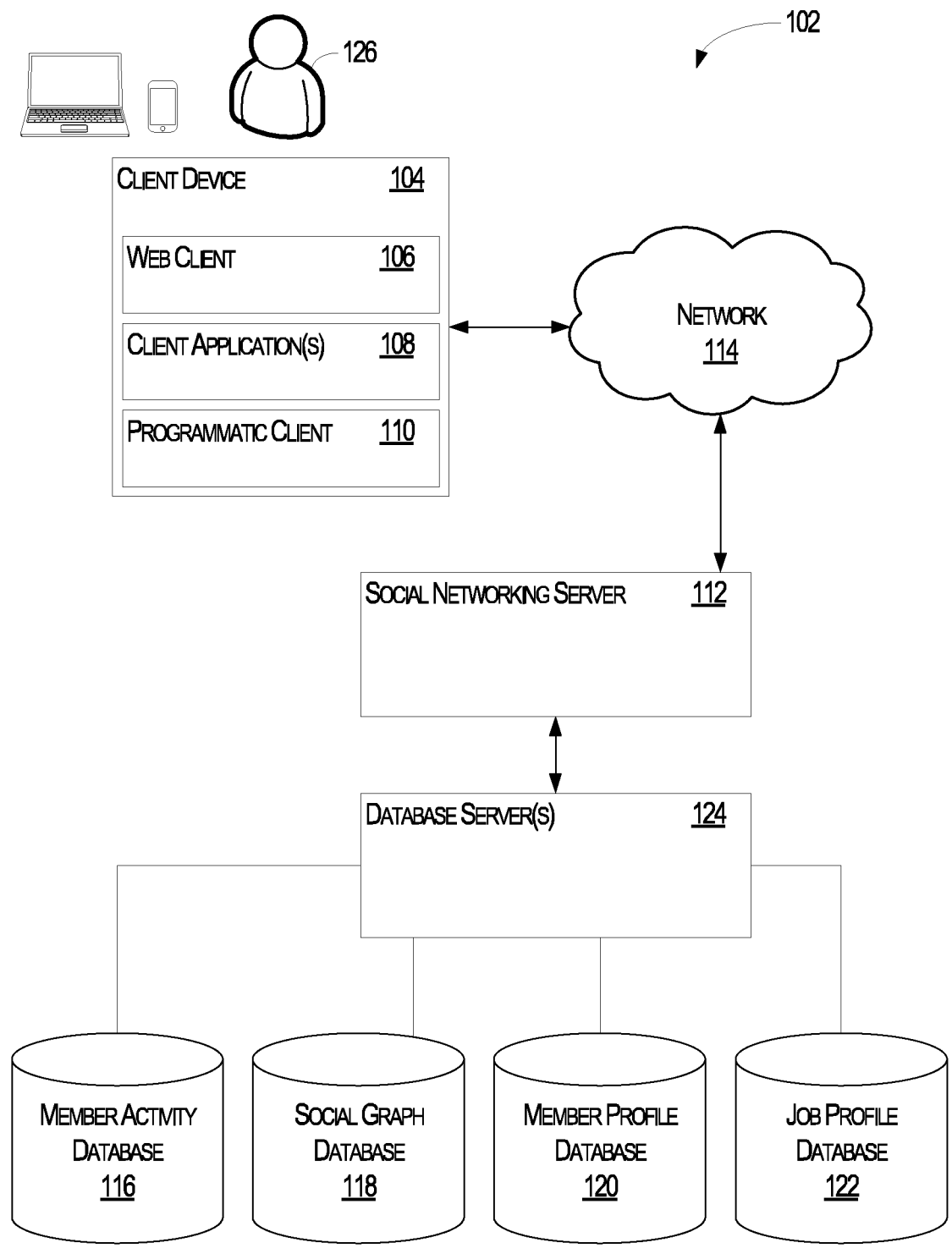
FIG. 1 is a block diagram illustrating a networked system, according to some example embodiments, including a social networking server.

With reference to FIG. 1, an example embodiment of a high-level client-server-based network architecture 102 is shown. A social networking server 112 provides server-side functionality via a network 114 (e.g., the Internet or wide area network (WAN)) to one or more client devices 104. FIG. 1 illustrates, for example, a web client 106 (e.g., a browser, such as the Internet Explorer® browser developed by Microsoft® Corporation of Redmond, Wash. State), client application(s) 108, and a programmatic client 110 executing on client device 104. The social networking server 112 is further communicatively coupled with one or more database servers 124 that provide access to one or more databases 116-122.

The client device 104 may comprise, but is not limited to, a mobile phone, desktop computer, laptop, portable digital assistants (PDAs), smart phone, tablet, ultra book, netbook, laptop, multi-processor system, microprocessor-based or programmable consumer electronic, or any other communication device that a user 126 may utilize to access the social networking server 112. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, global positioning system (GPS) devices, and so forth. The client device 104 may be a device of a user 126 that is used to perform one or more searches for user profiles accessible to, or maintained by, the social networking server 112.

In one embodiment, the social networking server 112 is a network-based appliance that responds to initialization requests or search queries from the client device 104. One or more users 126 may be a person, a machine, or other means of interacting with the client device 104. In various embodiments, the user 126 is not part of the network architecture 102, but may interact with the network architecture 102 via the client device 104 or another means. For example, one or more portions of the network 114 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 104 may include one or more applications (also referred to as "apps") such as, but not limited to, a web browser, messaging application, electronic mail (email) application, a social networking access client, and the like. In some embodiments, if the social networking access client is included in the client device 104, then this application is configured to locally provide the user interface and at least some of the functionalities with the application configured to communicate with the social networking server 112, on an as needed basis, for data and/or processing capabilities not locally available (e.g., access to a member profile, to authenticate a user 126, to identify or locate other connected members, etc.). Conversely if the social networking access client is not included in the client device 104, the client device 104 may use its web browser to access the initialization and/or search functionalities of the social networking server 112.

One or more users 126 may be a person, a machine, or other means of interacting with the client device 104. In example embodiments, the user 126 is not part of the network architecture 102, but may interact with the network architecture 102 via the client device 104 or other means. For instance, the user 126 provides input (e.g., touch screen input or alphanumeric input) to the client device 104 and the input is communicated to the client-server-based network architecture 102 via the network 114. In this instance, the social networking server 112, in response to receiving the input from the user 126, communicates information to the client device 104 via the network 114 to be presented to the user 126. In this way, the user 126 can interact with the social networking server 112 using the client device 104.

Further, while the client-server-based network architecture 102 shown in FIG. 1 employs a client-server architecture, the present subject matter is of course not limited to such an architecture, and could equally well find application in a distributed, or peer-to-peer, architecture system, for example.

In addition to the client device 104, the social networking server 112 communicates with other one or more database server(s) 124 and/or database(s) 116-122. In one embodiment, the social networking server 112 is communicatively coupled to a member activity database 116, a social graph database 118, a member profile database 120, and a job profile database 122. The databases 116-122 may be implemented as one or more types of databases including, but not limited to, a hierarchical database, a relational database, an object-oriented database, one or more flat files, or combinations thereof.

The member profile database 120 stores member profile information about members who have registered with the social networking server 112. With regard to the member profile database 120, the member may include an individual person or an organization, such as a company, a corporation, a nonprofit organization, an educational institution, or other such organizations.

Consistent with some embodiments, when a person initially registers to become a member of the social networking service provided by the social networking server 112, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the member profile database 120. Similarly, when a representative of an organization initially registers the organization with the social networking service provided by the social networking server 112, the representative may be prompted to provide certain information about the organization. This information may be stored, for example, in the member profile database 120. With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Members of the social networking service may establish connections with one or more members and/or organizations of the social networking service. The connections may be defined as a social graph, where the member and/or organization is represented by a vertex in the social graph and the edges identify connections between vertices. In this regard, the edges may be bilateral (e.g., two members and/or organizations have agreed to form a connection), unilateral (e.g., one member has agreed to form a connection with another member), or combinations thereof. In this manner, members are said to be first-degree connections where a single edge connects the vertices representing the members; otherwise, members are said to be "nth"-degree connections where "n" is defined as the number of edges separating two vertices. As an example, two members are said to be "2nd-degree"

connections where each member shares a connection in common with the other member, but the members are not directly connected to one another. In one embodiment, the social graph maintained by the social networking server 112 is stored in the social graph database 118.

Although the foregoing discussion refers to "social graph" in the singular, one of ordinary skill in the art will recognize that the social graph database 118 may be configured to store multiple social graphs. For example, and without limitation, the social networking server 112 may maintain multiple social graphs, where each social graph corresponds to various geographic regions, industries, members, or combinations thereof.

As members interact with the social networking service provided by the social networking server 112, the social networking server 112 is configured to monitor these interactions. Examples of interactions include, but are not limited to, commenting on content posted by other members, viewing member profiles, editing or viewing a member's own profile, sharing content outside of the social networking service (e.g., an article provided by an entity other than the social networking server 112), updating a current status, posting content for other members to view and/or comment on, and other such interactions. In one embodiment, these interactions are stored in a member activity database 116, which associates interactions made by a member with his or her member profile stored in the member profile database 120.

As the social networking server 112 provides a platform for individuals and organizations to interact via a social networking service, one or more of the organizations may leverage the social networking service to recruit individual members or to advertise job openings within their organization. Accordingly, the social networking server 112 provides a job profile database 122 that maintains one or more job profiles corresponding to job openings that organizational members have made available via the social networking service. In one embodiment, a job profile includes the organization associated with the job, a job title identifying a title associated with the job, one or more job functions expected to be performed by the individual hired for the job, minimum educational requirements for the job, and one or more skills that a job candidate should possess when applying for the job. In this manner, as individual members interact with the social networking service provided by the social networking server 112, one or more advertisements corresponding to the job profiles may be displayed to the individual members.

In one embodiment, the social networking server 112 communicates with the various databases 116-122 through one or more database server(s) 124. In this regard, the database server(s) 124 provide one or more interfaces and/or services for providing content to, modifying content in, removing content from, or otherwise interacting with, the databases 116-122. For example, and without limitation, such interfaces and/or services may include one or more Application Programming Interfaces (APIs), one or more services provided via a Service-Oriented Architecture ("SOA"), one or more services provided via a REST-Oriented Architecture ("ROA"), or combinations thereof. In an alternative embodiment, the social networking server 112 communicates with the databases 116-122 and includes a database client, engine, and/or module, for providing data to, modifying data stored within, and/or retrieving data from, the one or more databases 116-122.

While the database server(s) 124 is illustrated as a single block, one of ordinary skill in the art will recognize that the database server(s) 124 may include one or more such servers. For example, the database server(s) 124 may include, but are not limited to, a Microsoft® Exchange Server, a Microsoft® Sharepoint® Server, a Lightweight Directory Access Protocol ("LDAP") server, a MySQL database server, or any other server configured to provide access to one or more of the databases 116-122, or combinations thereof. Accordingly, and in one embodiment, the database server(s) 124 implemented by the social networking service are further configured to communicate with the social networking server 112.

Figure 2:
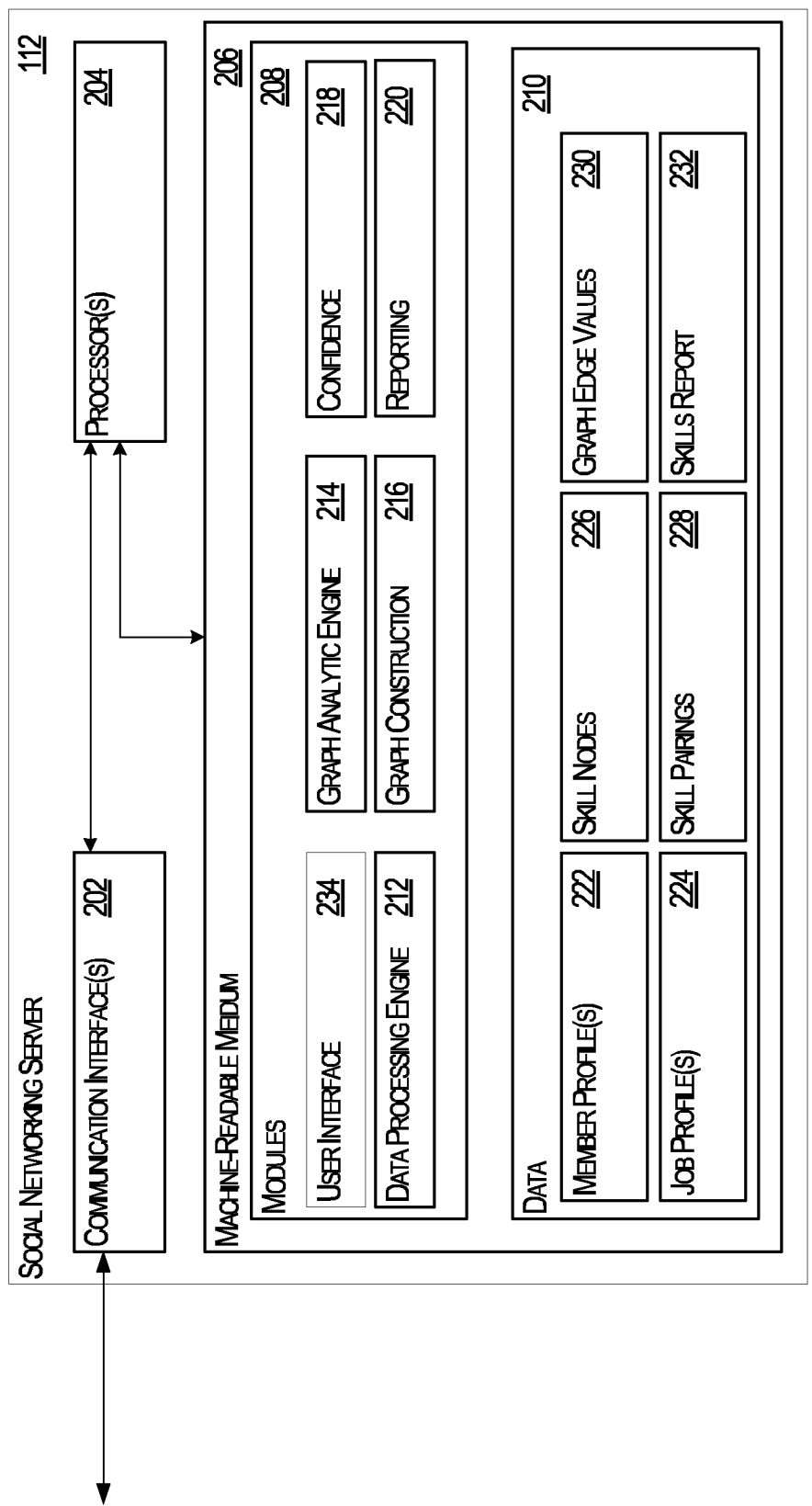
FIG. 2 illustrates the social networking server of FIG. 1, according to an example embodiment.

FIG. 2 illustrates the social networking server 112 of FIG. 1 in accordance with an example embodiment. In one embodiment, the social networking server 112 includes one or more processor(s) 204, one or more communication interface(s) 202, and a machine-readable medium 206 that stores computer-executable instructions for one or more modules 208 and data 210 used to support one or more functionalities of the modules 208.

The various functional components of the social networking server 112 may reside on a single device or may be distributed across several computers in various arrangements. The various components of the social networking server 112 may, furthermore, access one or more databases (e.g., databases 116-122 or any of data 210), and each of the various components of the social networking server 112 may be in communication with one another. Further, while the components of FIG. 2 are discussed in the singular sense, it will be appreciated that in other embodiments multiple instances of the components may be employed.

The one or more processors 204 may be any type of commercially available processor, such as processors available from the Intel Corporation, Advanced Micro Devices, Texas Instruments, or other such processors. Further still, the one or more processors 204 may include one or more special-purpose processors, such as a Field-Programmable Gate Array (FPGA) or an Application Specific Integrated Circuit (ASIC). The one or more processors 204 may also include programmable logic or circuitry that is temporarily configured by software to perform certain operations. Thus, once configured by such software, the one or more processors 204 become specific machines (or specific components of a machine) uniquely tailored to perform the configured functions and are no longer general-purpose processors.

The one or more communication interfaces 202 are configured to facilitate communications between the social networking server 112, the client device 104, and one or more of the database server(s) 124 and/or databases 116-122. The one or more communication interfaces 202 may include one or more wired interfaces (e.g., an Ethernet interface, Universal Serial Bus ("USB") interface, a Thunderbolt® interface, etc.), one or more wireless interfaces (e.g., an IEEE 802.11b/g/n interface, a Bluetooth® interface, an IEEE 802.16 interface, etc.), or combinations of such wired and wireless interfaces.

The machine-readable medium 206 includes various modules 208 and data 210 for implementing the social networking server 112. The machine-readable medium 206 includes one or more devices configured to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the modules 208 and the data 210. Accordingly, the machine-readable medium 206 may be implemented as a single storage apparatus or device, or, alternatively and/or additionally, as "cloud-based" storage systems or storage networks that include multiple storage apparatus or devices. As shown in FIG. 2, the machine-readable medium 206 excludes signals per se.

In one embodiment, the modules 208 are written in a computer-programming and/or scripting language. Examples of such languages include, but are not limited to, C, C++, C#, Java, JavaScript, Perl, Python, or any other computer programming and/or scripting language now known or later developed.

With reference to FIG. 2, the modules 208 of the social networking server 112 include, but are not limited to, a user interface module 234, a data processing engine 212, a graph analytic engine 214, a graph construction module 216, a confidence module 218, and a reporting module 220. The data 210 referenced and used by the modules 208 include one or more member profile(s) 222, one or more job profile(s) 224, various skill nodes 226, skill pairings 228, graph edge values 230, and a skills report 232. The result from processing the data 210 includes the skills report 232, which is communicated to the client device 104.

The user interface module 234 is configured to provide access to, and interactions with, the social networking server 112. In one embodiment, the user interface module 234 provides one or more graphical user interfaces, which may be provided using the Hypertext Transfer Protocol (HTTP). The graphical user interfaces are displayable by the client device 104 and accept input from the user 126 for interacting with the social networking server 112. Further still, the user interface module 234 may be configured to provide such interfaces to one or more clients displayable by the client device 104, such as the web client 106, one or more client applications 108, or the programmatic client 110. By interacting with the user interface module 234, the user 126 can instruct the social networking server 112 to generate one or more skills report 232 from various profile data (e.g., the member profile(s) 222 and the job profile(s) 224) and selected ones of the job profile(s) 224. Further still, the user interface module 234 is configured to generate a display of one or more of the skills report 232 generated by the social networking server 112.

In one embodiment, the user interface module 234 provides a graphical user interface for receiving a user selection of a given target or desired skill and/or an advertisement associated with a job opening corresponding to one or more of the job profile(s) 224. A target or desired skill may include one or more skills associated with a particular job opening or one or more skills associated with another member of the social networking service. In this regard, when the user selects one or more skills as targets or desired skills, the social networking server 112 generates a skills report 232 (as discussed below) that identifies one or more intermediary skills the user 126 may acquire or learn to help him or her achieve the desired or target skill.

In addition, the social networking server 112 may identify training programs offered by organizational members to help the user 126 learn the intermediary skills as they progress towards the desired or target skill. In one embodiment, an organizational member notifies the social networking server 112 that the organizational member offers the training program and identifies one or more skills that a participant would learn from engaging such training program.

Similarly, during interactions with the social networking service, the user 126 may be presented with one or more advertisements for job openings associated with one or more of the job profiles 224. When such advertisement is selected, the user 126 may be presented with details about the associated job opening such as the organizational member associated with the job opening, the job functions associated with the job opening, the skills that a potential candidate for the job opening should possess, and other such details retrievable from the corresponding job profile 224. Further still, an option may be presented to the user 126 to learn how the user 126 can achieve or learn the skills associated with the job opening. In a similar fashion as selecting a target or desired skill, the social networking server 112 provides a listing of one or more training programs that would help the user 126 learn or achieve one or more intermediary skills as he or she progresses towards the skills associated with the job opening.

The data processing engine 212 is configured to process data retrieved from one or more of the databases 116-122. In addition, the data processing engine 212 provides a platform in which one or more of the other modules 208 are instantiated, such as the graph analytic engine 214, the graph construction module 216, the confidence module 218, and/or the reporting module 220. In one embodiment, the data processing engine 212 is implemented as Apache Spark™, which is available from the Apache Software Foundation. As known to one of ordinary skill in the art, Apache Spark™ is an open-source cluster computing framework that includes various modules and APIs for streaming, Structured Query Language (SQL), machine learning and graph processing. Further still, and in one embodiment, the data processing engine 212 is configured to retrieve data from one or more of the databases 116-122 including, but not limited to, one or more social graphs from the social graph database 118, one or more member profiles 222 from the member profile database 120, and one or more job profiles 224 from the job profile database 122. Member profile information retrieved from the member profile database 120 is stored as the member profile(s) 222, and job profile information retrieved from the job profile database 122 is stored as the job profile(s) 224. As discussed below with reference to the graph construction module 216 and the graph analytic engine 214, the data processing engine 212 may be further configured to extract particular attributes from the retrieved member profile information, one or more of the retrieved social graphs, and/or one or more of the retrieved job profile information.

The graph construction module 216 is configured to construct a graph from the data retrieved by the data processing engine 212. In one embodiment, the graph construction module 216 is implemented as GraphX. As one of ordinary skill in the art would understand, GraphX is a set of APIs available through Apache Spark™ that provide for exploratory analysis, construction, and iterative graph computations. The graph construction module 216 is configured to construct one or more graphs from data representing one or more nodes and/or one or more edges. In one embodiment, the graph construction module 216 constructs the one or more graphs based on the data retrieved by the data processing engine 212 including, but not limited to, one or more attribute values extracted from the retrieved member profiles 222 and the retrieved job profiles 224.

The attributes extracted from a retrieved member profile 222 include one or more skills (e.g., "writing," "programming," "painting," "graphic design," etc.) that the member corresponding to the retrieved member profile 222 has identified as possessing or that other members of the social networking service have identified the member corresponding to the retrieved member profile 222 as possessing. For example, these identifications by the member or other members may occur while the member has a member profile with the social networking service or while the member interacts with the social networking service. Similarly, and in one embodiment, the attributes extracted from a retrieved job profile 224 include one or more skills that the owner or organizational member associated with the job profile 224 have identified or selected.

In one embodiment, the graph construction module 216 defines the nodes of one or more graphs as the skill attributes extracted from the retrieved member profiles 222 and/or the retrieved job profiles 224. In particular, each node in a graph may correspond to a single skill and the graph may include a unique set of nodes such that a given skill is not duplicated. The graph construction module 216 stores the nodes representing the skill attributes of the member profile(s) 222 and/or the job profile(s) 224 as the skill nodes 226.

In an alternative embodiment, the graph construction module 216 defines the skill nodes 226 by retrieving a preconfigured list of skills maintained by the social networking server 112, and defines nodes corresponding to each one of the skills of the preconfigured list of skills. In this alternative embodiment, the skill nodes 226 may include nodes corresponding to skills that are not listed by one or more of the member profile(s) 222 and/or the job profile(s) 224. In some instances, the skill nodes 226 may omit nodes for skills in the preconfigured list of skills where the omitted skills are not associated with any of the member profile(s) 222 or any of the job profile(s) 224. In other instances, the user 126 or an administrator of the social networking server 112 may choose which skills to include from the member profiles 222, the job profiles 224, and/or the preconfigured list of skills as nodes for the skill nodes 226.

Each of the skill nodes 226 are connected by one or more edges to other skill nodes 226. Edges between the skill nodes 226 indicate a correlation. Thus, a first skill node is directly correlated to a second skill node where an edge directly connects a first skill node to the second skill node (e.g., there are no intervening nodes between the first skill node and the second skill node). In one embodiment, the skills associated with one or more of the member profile(s) 222 are used as a proxy to establish correlation between the nodes. In this manner, an edge directly connects a first node and a second node where at least one member profile is associated with the first skill and the second skill.

However, as discussed below, a first node may still be connected to a second node where there are intervening nodes between the first node and the second node. While there may be intervening nodes between the first node and the second node, this disclosure contemplates that, even in this instance, the first node and the second node are still correlated. In alternative terms, where there are intervening nodes between a first node and a second node, the first node and the second node are considered indirectly correlated. By establishing edges between nodes using the member profile(s) 222 as a proxy for correlation, the social networking server 112 can identify intervening skills (e.g., intervening nodes) that a member may learn if he or she desires to learn a desired skill (e.g., the second skill or second node) given that the member has an initial skill or skills (e.g., the first skill or first node).

In addition to establishing edges between the skill nodes 226, the graph construction module 216 determines a value for one or more of the edges. In one embodiment, the graph construction module 216 communicates with a confidence module 218 to determine these values. By assigning a value to each edge connecting a pair of nodes, the social networking server 112 can identify a minimum value path representing the most co-related set of skills given a starting or initial skill (e.g., a first node) and a target or desired skill (e.g., a second node). In one embodiment, the graph construction module 216 stores the determined edge of values for a pair of nodes as the graph edge values 230. The pseudocode below provides one methodology for assigning the graph edges values:

---
Begin:
   i = the set of member profiles that are associated with Skill A and Skill B;
   For each member i;
     Let x[i] = member(i).getConfidenceScore(Skill A);
     Let y[i] = member(i).getConfidenceScore(Skill B);
     ConfidenceScore[i] = x[i] * y[i];
   EdgeValue(Skill A, Skill B) = SumAll(ConfidenceScore[i]);
End.

---

In the pseudocode above, the method getConfidenceScore( ) returns a value indicating the confidence that the ith member possesses a given skill. In one embodiment, the method getConfidenceScore( ) is implemented to return a ranking of the ith member having the given skill as described in U.S. Pat. No. 8,650,177, titled "SKILL EXTRACTION SYSTEM," and is incorporated by reference herein in its entirety. The confidence module 218 is configured to implement the getConfidenceScore( ) methodology, where input parameters to getConfidenceScore( ) may include a member profile or member profile identifier, and a skill associated with the member profile.

In this embodiment, the ranking of the member is used to approximate, or as a proxy for, a confidence value that the member possesses the given skill (e.g., Skill A and Skill B in the pseudocode above). As shown above, the value for an edge is the summation of the confidence scores associated with member profiles that have been identified as being associated with both a given first skill (e.g., Skill A) and a given second skill (e.g., Skill B).

In this manner, the minimum distance value between a pair of nodes indicates the shortest path a member could traverse to achieve or learn a desired skill. As used in this context, the minimum distance value between a pair of nodes is the summation of the edge values 230 between the pair of nodes. This is because the method getConfidenceScore( ) returns a value where a smaller value indicates that the member is more likely to possess a given skill. However, in alternative embodiments where getConfidenceScore( ) returns a value where a greater value indicates that the member is more likely to possess a given skill, the shortest path a member could traverse to achieve or learn a desired skill would be the maximum distance value between a pair of nodes.

Figure 3:
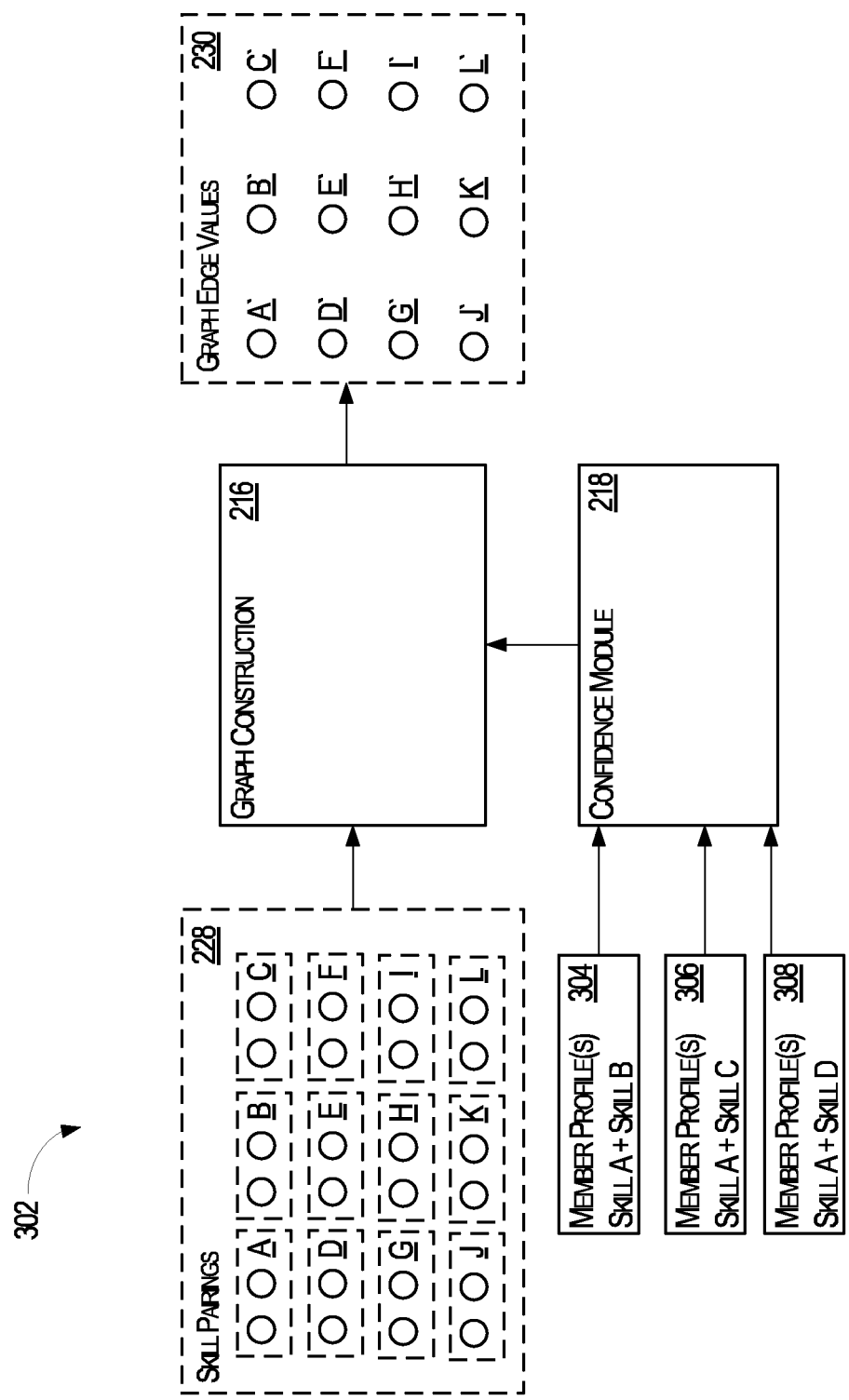
FIG. 3 illustrates an example of assigning graph edge values to pairs of skill nodes defined by the social networking server of FIG. 1, according to an example embodiment.

FIG. 3 illustrates an example 302 of assigning graph edge values to pairs of skill nodes defined by the social networking server 112 of FIG. 1, according to an example embodiment. As shown in FIG. 3, one or more skill pairings 228 are provided as input to the graph construction module 216. In one embodiment, the skill pairings 228 are based on the skill nodes 226 and are paired such that each node of the skill nodes 226 is paired with another node of the skill nodes 226. In an alternative embodiment, skill pairings 228 are selected according to the skills associated with the member profiles 222. In this alternative embodiment, the skill pairings 228 are determined by analyzing each member profile of the member profile(s) 222 and identifying the skills associated with each member profile. In this manner, where a member profile is associated with three different skills (e.g., a first skill, a second skill, and the three skill), there are a total of three pairings. In the example 302 of FIG. 3, there are twelve pairings A-L, where each pairing is associated with a corresponding graph edge value 230.

FIG. 3 also illustrates that three sets of member profiles 304-308, along with various skill pairings 228, are being communicated to the confidence module 218 to determine the graph edge values 230 for the skill pairings 228 determined from the sets of member profiles 304-308. In the example 302 of FIG. 3, the skill pairings 228 include a first skill (e.g., Skill A) and a second skill (e.g., Skill B), the first skill and a third skill (e.g., Skill C), and the first skill and the fourth skill (e.g., Skill D). These skill pairings 228 may correspond to skill pairings A-C of the skill pairings 228. Accordingly, the confidence module 218 determines graph edge values A'-C', which are then each associated with their corresponding skill pairings A-C by way of the graph construction module 216.

While FIG. 3 only illustrates three sets of member profiles 304-308 for three corresponding skill pairings 228, one of ordinary skill in the art will appreciate that different member sets corresponding to different skill pairings are communicated to the confidence module 218 until the various combinations of skill pairings 228 are exhausted. In one embodiment, where skill nodes 226 are paired regardless of whether there is an associated member profile set, the corresponding graph edge value may be set to a NULL value such that the edge corresponding to the graph edge value is skipped or bypassed by the graph analytic engine 214 in determining the minimum or maximum distance value between a pair of nodes.

After the graph edge values 230 are associated with the various skill pairings 228 and/or the skill nodes 226, the graph construction module 216 has effectively constructed a skills graph representing the interconnectedness of skills associated with the member profile(s) 222. The graph analytic engine 214 is configured to determine the minimum distance value path for the maximum distance value path between an initial or starting node and a desired or target node from the constructed skills graph. In one embodiment, the graph analytic engine 214 performs Dijkstra's algorithm on the skills graph given the initial skill and the desired skill. In an alternative embodiment, the graph analytic engine 214 performs a Bellman-Ford algorithm on the skills graph given the initial skill and the desired skill. One of ordinary skill in the art will appreciate that other algorithms that solve a shortest path problem may be implemented by the graph analytic engine 214 and are contemplated as falling within the scope of this disclosure.

Figure 4:
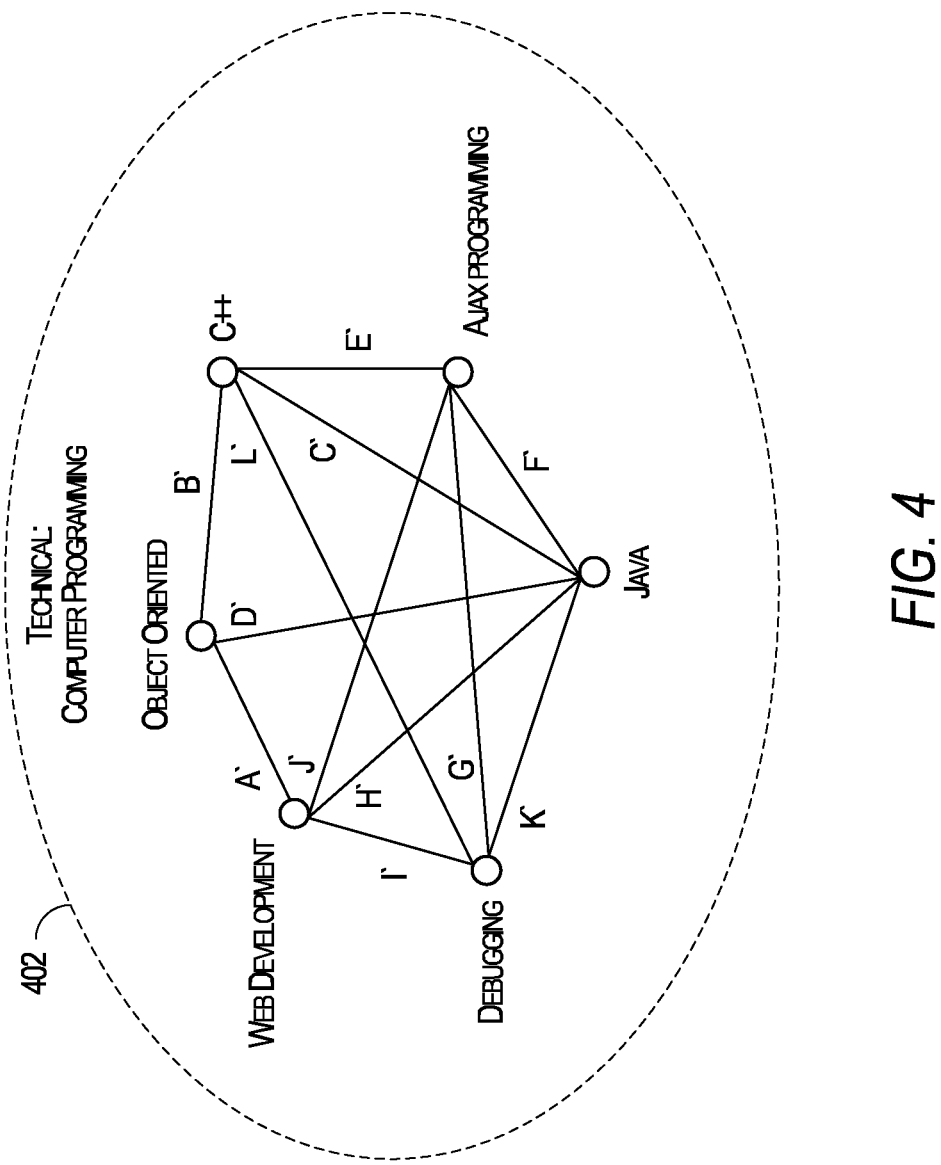
FIG. 4 illustrates an example of a skills graph determined by the social networking server of FIG. 1, according to an example embodiment.

In one embodiment, the skill nodes 226 are further clustered according to a category or topic to which the corresponding skill belongs. FIG. 4 illustrates an example of a skills graph 402 determined by the social networking server 112 of FIG. 1, according to an example embodiment. In the example shown in FIG. 4, the skills graph 402 includes a single cluster corresponding to the category of "TECHNICAL: COMPUTER PROGRAMMING," which includes various skill nodes, which may be selected from the skill nodes 226. One or more of the skill nodes are connected by edges A'-L', where each edge is associated with a corresponding graph edge value. The skills illustrated in the skills graph 402 include "object-oriented," "C++," "AJAX programming," "Java," "debugging," and "web development." Each of these nodes may be assigned to the category of "TECHNICAL: COMPUTER PROGRAMMING" based on a preconfigured list of skills maintained by the social networking server 112. For example, the social networking server 112 may maintain a lookup table or other database of skills where each skill is associated with a corresponding category.

Referring to the skills graph 402, suppose a member of the social networking server 112 desires to learn the skill of AJAX programming, but is only familiar with object-oriented programming (e.g., the only skill associated with the member profile corresponding to this member is "object-oriented"). According to the skills graph 402, there are multiple paths leading from "object-oriented" to "Ajax programming." For example, and without exhausting all possible paths, these paths include edges B'-E', edges D'-F', edges A'-I'-K'-F', and edges A'-J'. Each of these paths lead through intermediary nodes, which indicate intermediary skills that could help the member learn the desired skill of "AJAX programming." The path that is selected and communicated to the member will depend on the values assigned to the edges, but is a path that is either a minimum distance value path or a maximum distance value path depending on the way in which the confidence module 218 is implemented. As discussed above, the graph analytic engine 214 determines the path from the node corresponding to the "object-oriented" skill to the node corresponding to the "AJAX programming" skill.

Figure 5:
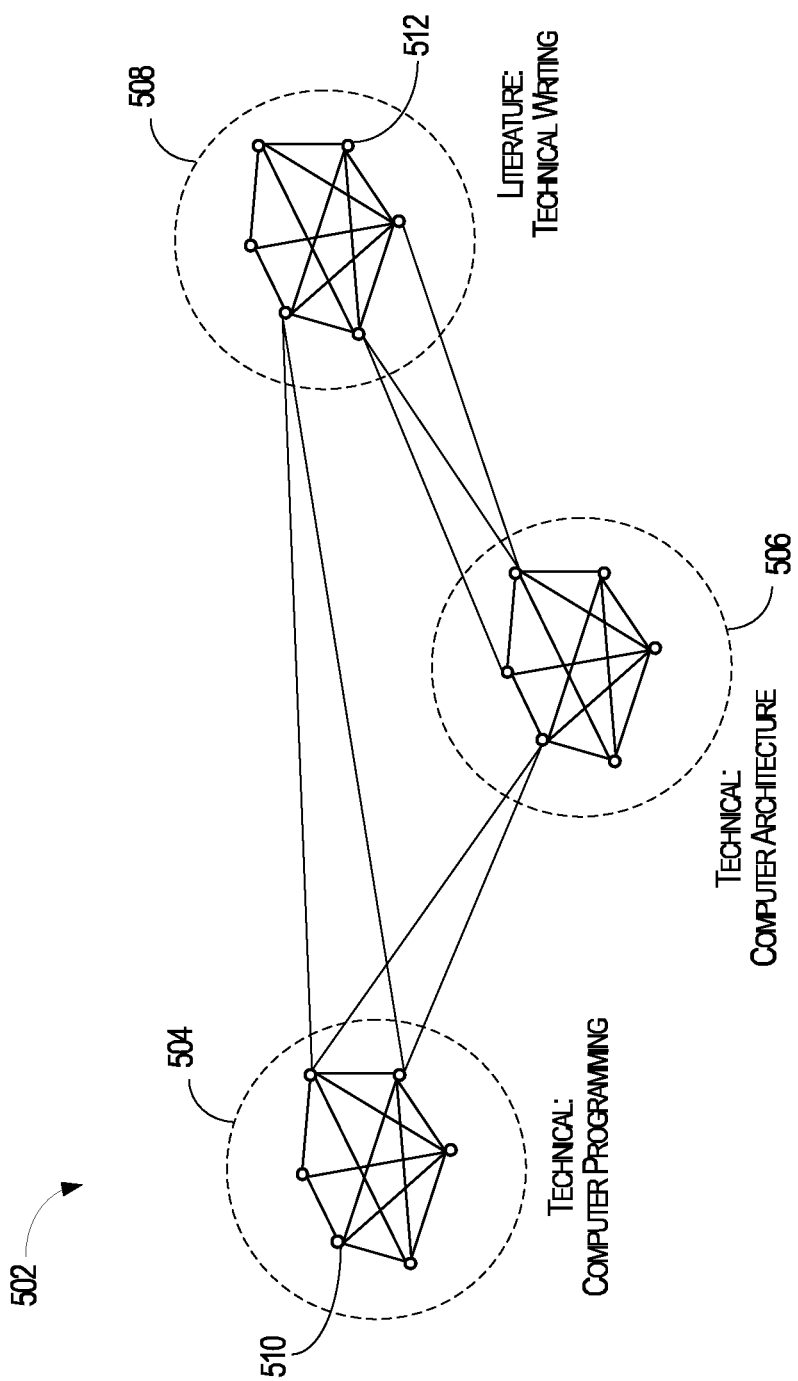
FIG. 5 illustrates an example of a skills graph having clusters of different skill nodes, according to an example embodiment.

In addition to determining a path within a cluster of skill nodes 226, the graph analytic engine 214 is also configured to determine a path between clusters of skill nodes 226. FIG. 5 illustrates an example of a skills graph 502 having clusters 504-508 of different skill nodes, according to an example embodiment. As shown in FIG. 5, the skills graph 502 includes a first cluster 504 of skill nodes categorized as "TECHNICAL: COMPUTER PROGRAMMING," a second cluster 506 of skill nodes categorized as "TECHNICAL: COMPUTER ARCHITECTURE," and a third cluster 508 of skill nodes categorized as "LITERATURE: TECHNICAL WRITING." Each of the clusters 504-508 may be determined as discussed previously, where the edges within clusters are determined based on pairing skill nodes according to the skills associated with one or more member profile(s) 222. Edges between clusters, such as the edges between the first cluster 504 and the third cluster 508, may be established because there may be one or more member profile associated with a first skill categorized as "TECHNICAL: COMPUTER PROGRAMMING" and a second skill categorized as "LITERATURE: TECHNICAL WRITING."

Like the skills graph 402 illustrated in FIG. 4, the graph analytic engine 214 is also configured to explore and traverse edges of a multiple cluster skills graph like the skills graph 502 of FIG. 5. In one embodiment, the graph analytic engine 214 is configured to determine a path between an initial or starting node 510 and a desired or target node 512, and to provide an output that includes one or more intermediary nodes that lie along this path. For example, the graph analytic engine 214 may determine that the path between the initial node 510 and the target node 512 bypasses the second cluster 506. In this example, the listing of skills to achieve the target skill (e.g., the skill associated with the target node 512) may omit the skills categorized within the second cluster 506. However, the graph analytic engine 214 may determine that the path between the initial node 510 and the target node 512 includes a second cluster 506, in which case the listing of skills would include one or more intermediary skills categorized within the second cluster 506. In this manner, the number of skills and clusters accommodated by the social networking server 112 may include hundreds or thousands of skills and/or clusters such that any one skill maintained by the social networking server 112 may be correlated (e.g., directly or indirectly) to any other skill.

Figure 6:
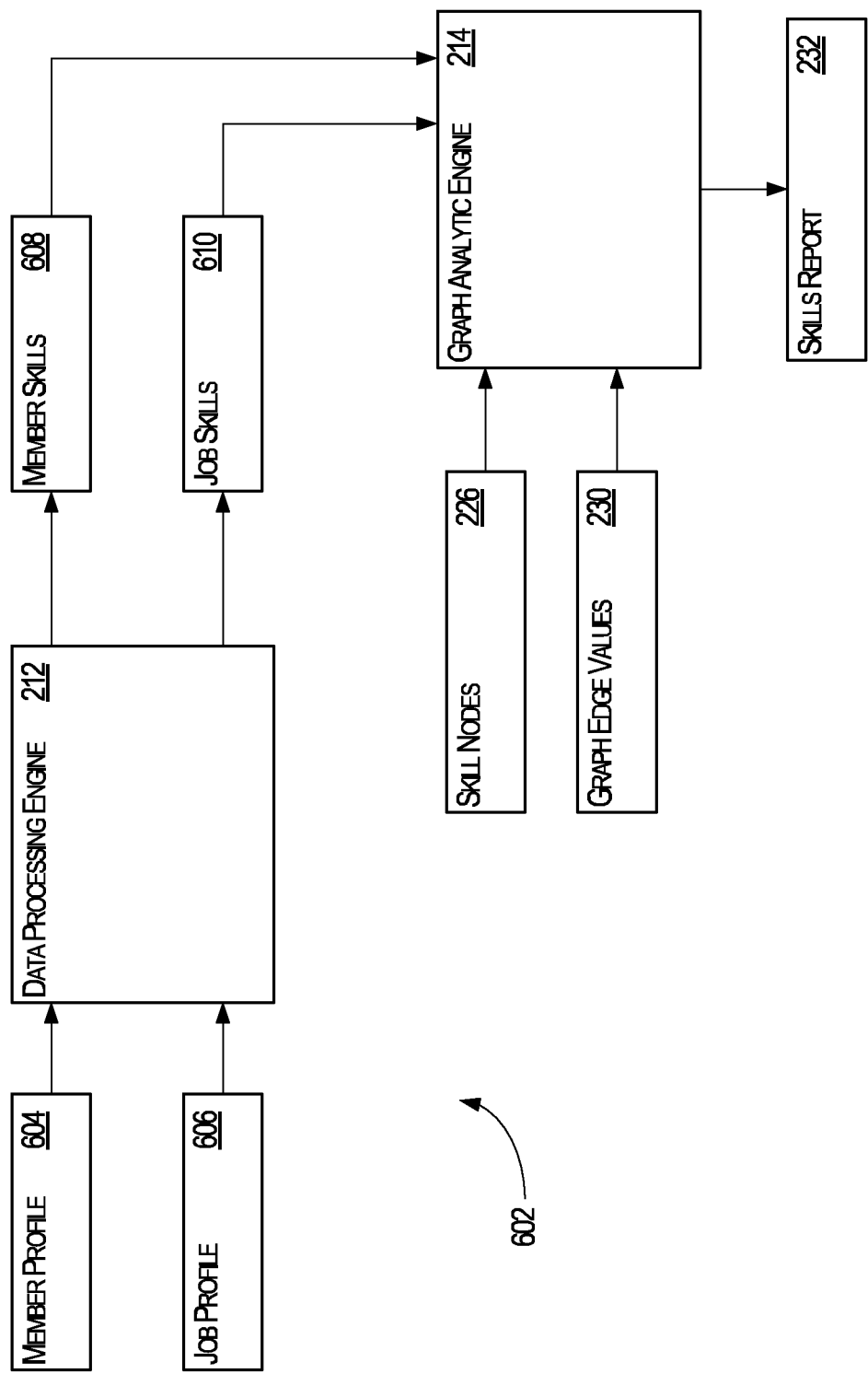
FIG. 6 illustrates an example of determining a path to achieving one or more skills associated with a job opening, according to an example embodiment.

Having determined a skills graph for the member profile(s) 222 (e.g., a single cluster skills graph or a multiple cluster skills graph), the social networking server 112 can identify intermediary skills a member may learn to help reach a desired skill associated with a job opening listed by an organizational member of the social networking service. FIG. 6 illustrates an example 602 of determining a path to achieving one or more skills associated with a job opening, according to an example embodiment.

As shown in FIG. 6, the data processing engine 212 is provided with a member profile 604 and a selected job profile 606. In one embodiment, the member profile 604 corresponds to a member viewing advertisements associated with various job openings. As discussed above, such job openings are associated with one or more job profiles (e.g., job profile(s) 224). Accordingly, when a member submits a request to learn about how to achieve one or more skills associated with a given job opening, the member profile corresponding to the member and the job profile corresponding to the given job opening are communicated to the data processing engine 212.

The data processing engine 212 then extracts or retrieves one or more member skills 608 from the member profile 604 and one or more job skills 610 associated with the job profile 606. The data processing engine 212 may store the retrieved member skills 608 and the retrieved job skills 610 in the machine-readable medium 206. Thereafter, the member skills 608 and the job skills 610 are communicated to the graph analytic engine 214.

The graph analytic engine 214 then determines a path from one or more of the member skills 608 to one or more of the job skills 610 using the previously determined skills graph (e.g., the skill nodes 226 and the graph edge values 230). In one embodiment, the graph analytic engine 214 determines either a minimum distance value path or maximum distance value path for each member skill paired with each job skill. Supposing that there are M member skills 608 and N job skills 610, the total number of member skills 608 paired with job skills 610 is M×N.

The graph analytic engine 214 then generates a skills report 232 that includes the minimum distance value path or maximum distance value path for one or more of the job skills 610. In one embodiment, this skills reports 232 identifies the intermediary skills (e.g., the intermediary skill nodes) that the member could learn to achieve a desired job skill given his or her initial member skills. The skills report 232 may be configurable such that the member may request a verbose skills report, where the verbose skills report includes the minimum distance value path or maximum distance value path for each member skill and job skill pairing (e.g., for a total of M×N paths). Alternatively, the member may select which paths are to be included in the report given a member skill, a job skill, or a member and job skill pairing. In this manner, the skills report 232 is configurable along many different metrics depending on the level of detail requested by the member.

Referring back to FIG. 2, the reporting module 220 is configured to communicate the skills report 232 to the client device 104. In one embodiment, the skills report 232 is communicated in an electronic document format readable by a word processing or other electronic document reader. In alternative embodiments, the skills report 232 is embedded within an HTML document and viewable by the web client 106 being executed by the client device 104. In this embodiment, the skills report 232 may be provided within a graphical user interface generated by the user interface 234 such that the skills report 232 is displayable alongside any interface used to interact with the social networking server 112. Embedding the skills report 232 within an HTML document makes it possible for the member to review the skills report 232 while concurrently taking advantage of the services and products offered by the social networking server 112.

Figure 7A:
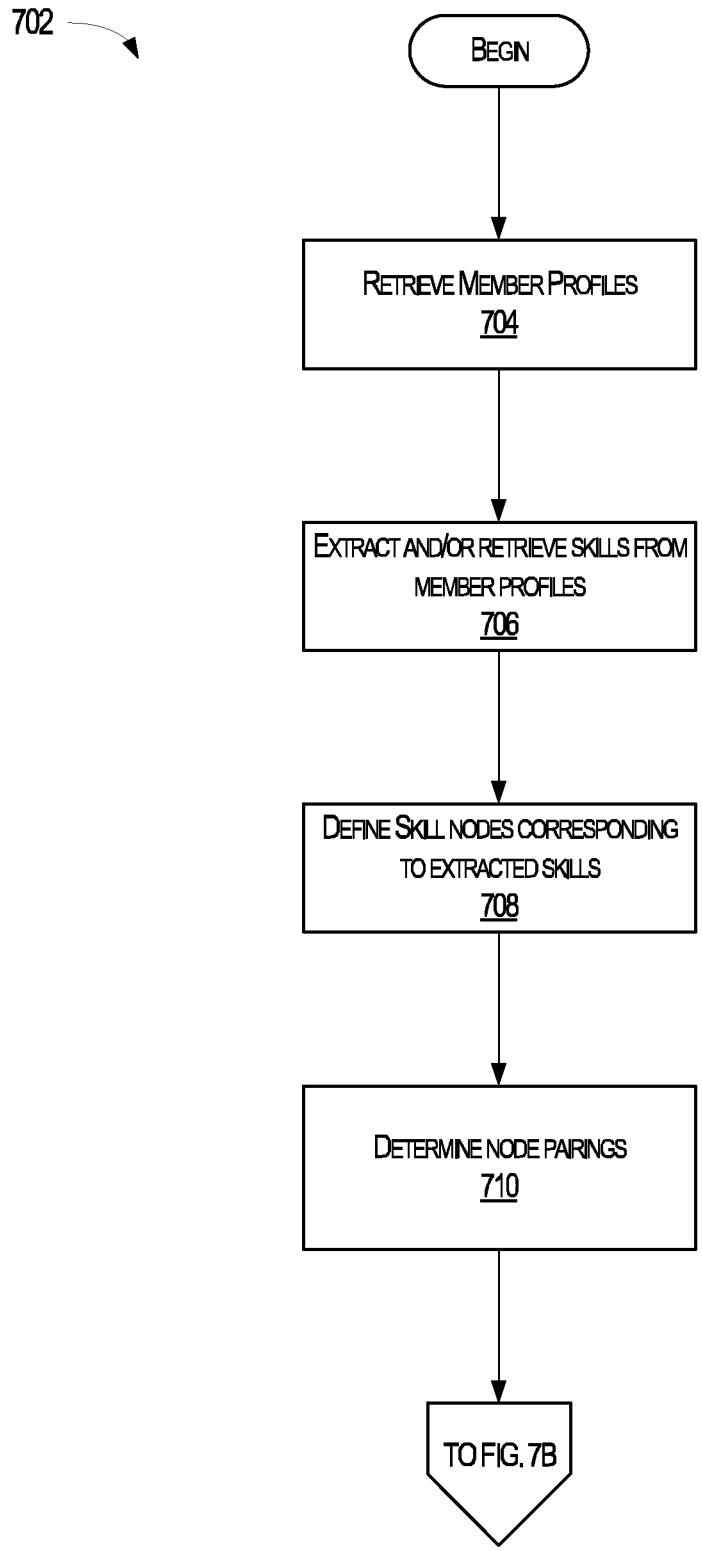
FIGS. 7A-7B illustrate a method, in accordance with an example embodiment, for generating a skills graph by the social networking server of FIG. 1.
Figure 7B:
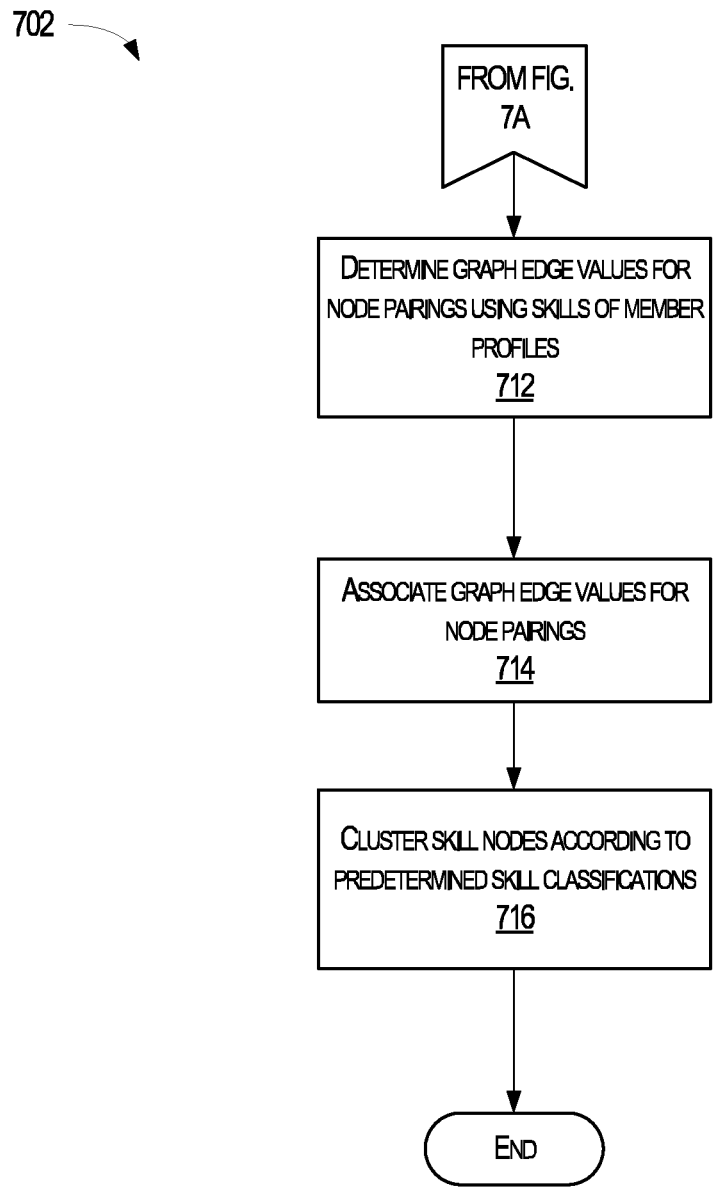

FIGS. 7A-7B illustrate a method 702, in accordance with an example embodiment, for determining a path to achieving one or more skills associated with a job opening. The method 702 may be implemented by one or more of the modules 208 and data 210 of the social networking server 112 and is discussed by way of reference thereto.

Initially, and with reference to FIG. 7A and FIG. 2, the social networking server 112, via the data processing engine 212, retrieves one or more member profiles from the member profile database 120 (Operation 704). In one embodiment, the retrieved member profiles are stored as the member profiles 222 and a machine-readable medium 206. The data processing engine 212 then extracts or retrieves one or more skills from the member profiles 222 (Operation 706). In this embodiment, and using the extracted skills, the graph construction module 216 then defines one or more skill nodes 226 corresponding to the extracted or retrieved skills (Operation 708). In an alternative embodiment, the graph construction module 216 defines one or more skill nodes 226 corresponding to skills determined from a preconfigured list of skills maintained by the social networking server 112.

Using the defined skills nodes 226, the graph construction module 216 then establishes one or more skill pairings 228, where a skill pairing 228 includes a first node and a second node selected from the skill nodes 226 (Operation 710). In one embodiment, the skill pairings 228 are determined from the member profiles 222. In this embodiment, a skill pairing is defined when a member profile includes the first node and the second node. In an alternative embodiment, skill pairings 228 are defined according to the skill nodes 226, such that each skill node is paired with every other skill node. In this embodiment, and as discussed previously, there may be instances where an edge value is not determinable for a given skill node pair (e.g., there are no member profiles 222 that include the skills associated with the skill node pair), in which case the edge value for this node pairing is assigned a NULL value.

Referring to FIG. 7B, the graph edge values 230 are then determined for the skill pairings 228 (Operation 712). As discussed with reference to FIG. 3, determining the graph edge values 230 includes processing member profiles 222 via the confidence module 218 and determining a confidence value for a given skill pairing. The confidence value is then assigned as the graph edge value for the skill pairing via the graph construction module 216 (Operation 714).

Finally, and in one embodiment, the graph construction module 216 clusters the skill nodes 226 according to one or more skill classifications previously assigned to the skills associated with the skill nodes 226 (Operation 716). Clustering the skill nodes 226 groups the skill nodes according to a general classification and may impact edge values that traverse clusters. For example, and with reference to FIG. 5, edges that extend between the first cluster 504 and the second cluster 506 may be adjusted by a weighting factor to indicate the degree of difficulty in transferring skills from the first cluster 504 to the second cluster 506. Where the skills of the first cluster 504 are not easily transferred to the skills of the second cluster 506, the weighting factor may increase the edge values between these clusters 504, 506, whereas if the skills of the first cluster 504 are easily transferred to the skills of the second cluster 506, the weighting factor may decrease the edge values between these clusters 504, 506. As one of ordinary skill in the art will recognize, the weighting factor will depend on whether the graph analytic engine 214 is configured to determine whether a minimum distance value path or a maximum distance value path is implemented.

Figure 8:
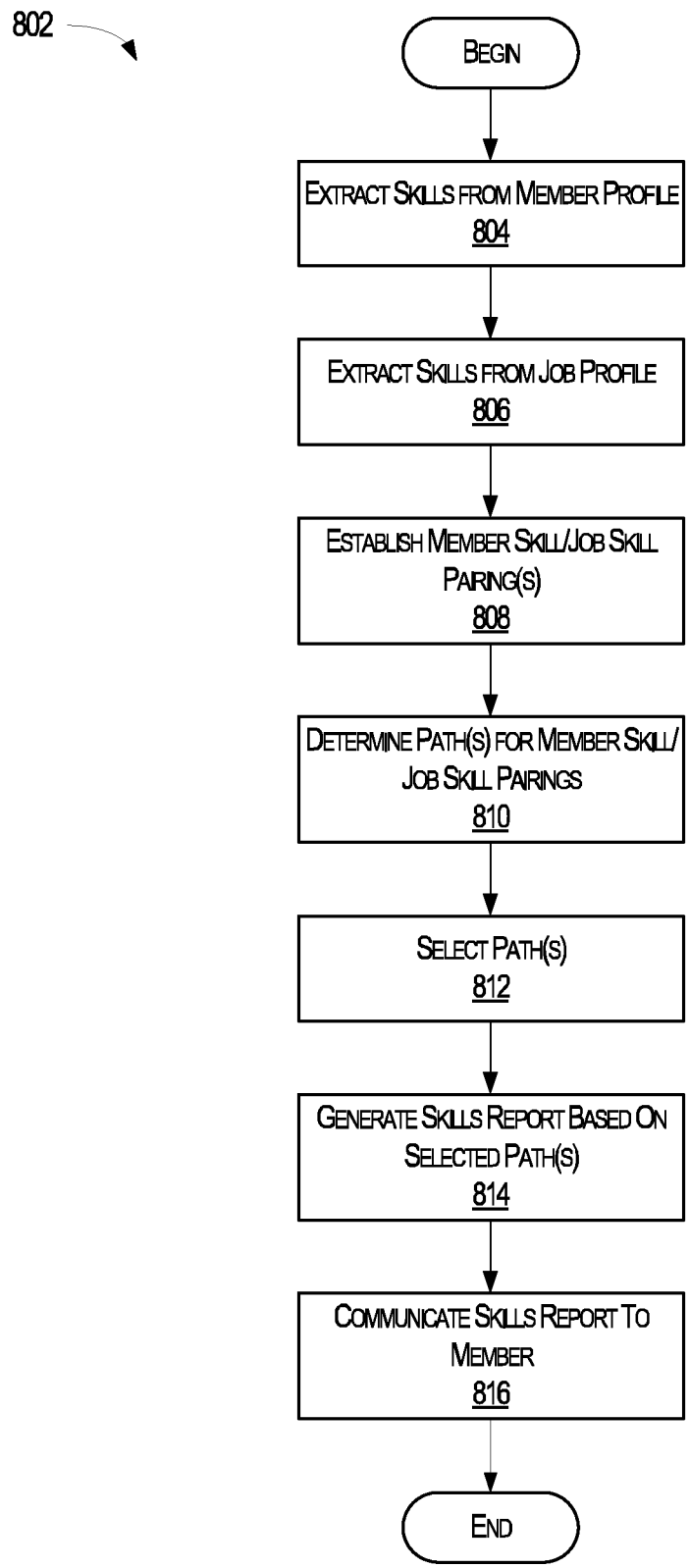
FIG. 8 illustrates a method, in accordance with an example embodiment, for determining a path to achieving one or more skills associated with a job opening.

FIG. 8 illustrates a method 802, in accordance with an example embodiment, for determining a path to achieving one or more skills associated with a job opening. The method 802 may be implemented by one or more of the modules 208 and data 210 of the social networking server 112 and is discussed by way of reference thereto.

Initially, the social networking server 112 obtains a member profile corresponding to a member viewing an advertisement corresponding to a job opening, and a job profile (e.g., job profile 606) corresponding to the job opening. The data processing engine 212 then extracts one or more skills from the obtained member profile (Operation 804) and one or more skills from the obtained job profile (Operation 806). The graph analytic engine 214 then establishes one or more skill pairings, where a skill pairing includes an initial skill selected from the member skills (e.g., member skills 608) and a target skill selected from the job skills (e.g., job skills 610) (Operation 808). For each skill pairing, the graph analytic engine 214 then determines the path from the initial skill to the target skill using the previously determined skills graph of FIGS. 7A-7B (Operation 810). As discussed throughout this disclosure, this path may be a minimum distance value path or a maximum distance value path depending on the manner in which the graph edge values 230 were determined.

In one embodiment, the graph analytic engine 214 then selectively determines which paths to include in the skills report 232 (Operation 812). For example, the skills report 232 may be configurable such that the member for whom the skills report 232 is being prepared may choose whether the skills report 232 is to be shortened or verbose. Where the skills report 232 is a shortened report, the graph analytic engine 214 may select the most minimum distance value path or most maximum distance value path from among all the determined paths. Alternatively or additionally, the graph analytic engine 214 may select the most minimum distance value path or most maximum distance value path for each initial skill. As one skilled in the art will recognize, other combinations and permutations of the manner in which paths are selected are contemplated as falling within the scope of this disclosure. Where the skills report 232 is a verbose report, all of the determined paths may be included in the report.

Having selected the path(s) to include in the skills report 232, the graph analytic engine 214 then generates a skills report 232 (Operation 814). In one embodiment, generating the skills report 232 includes listing or illustrating the path(s) and/or listing the intermediary skills that lie along the listed or illustrated path(s). The generated skills report 232 is then communicated to the client device 104 of the member via the reporting module 220 (Operation 816). In one embodiment, the skills report 232 is communicated as an electronic document readable by a word processing application or other electronic document reader. Additionally and/or alternatively, the skills report 232 may be embedded within an HTML document communicated to the client device 104.

In this manner, this disclosure provides systems and methods for identifying intermediary skills given a set of initial skills and one or more target or desired skills. The systems and methods disclosed herein may be implemented by a social networking server that provides a social networking service to members where the members have access to advertisements or other notifications about job openings. Ordinarily, a member of the social networking service would have to spend a significant amount of time and effort in researching the skills associated with the job opening and determining which of his or her skills would transfer to the job described by the job opening. This can lead to some qualified members being discouraged from applying to the job opening as they may be unable to figure out how their current skill set translates to the skill set associated with the job opening. This also impacts the employer associated with the job opening as a job may go unfulfilled as qualified members fail to apply for the job. Thus, the systems and methods disclosed herein streamline the jobseeking process and help members to truly understand their qualifications and plan a path for making career changes. The systems and methods disclosed herein also help employers as the systems and methods encourage members who otherwise may not have applied for a given job to apply. Accordingly, this disclosure has economic importance in finding potential employees and helping to keep the market at healthy employment levels.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-8 are implemented in some embodiments in the context of a machine and an associated software architecture. The sections below describe a representative architecture that is suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things" while yet another combination produces a server computer for use within a cloud computing architecture. Not all combinations of such software and hardware architectures are presented here as those of skill in the art can readily understand how to implement the inventive subject matter in different contexts from the disclosure contained herein.

Example Machine Architecture and Machine-Readable Medium

Figure 9:
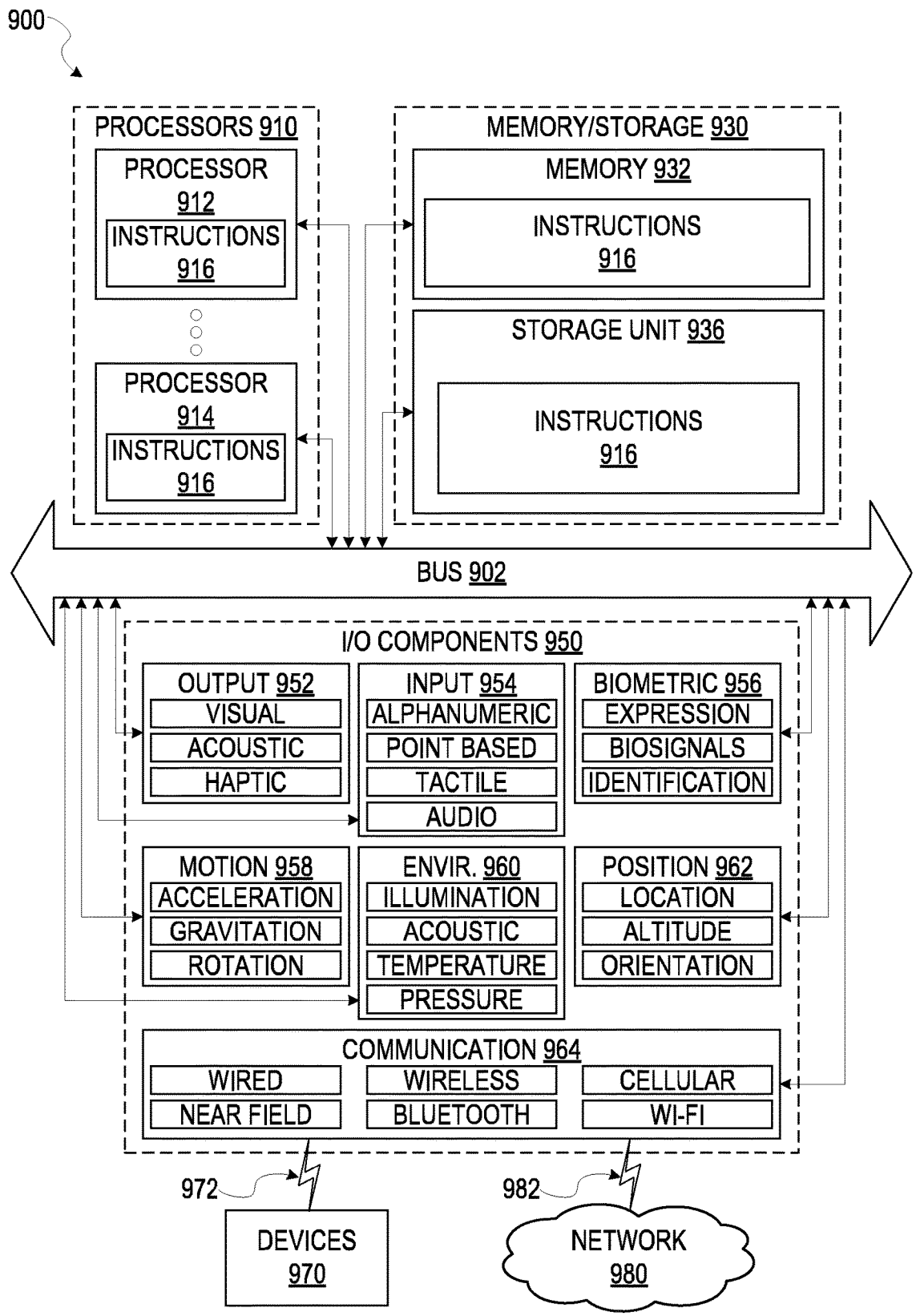
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the flow diagrams of FIGS. 7A-7B and FIG. 8. Additionally, or alternatively, the instructions 916 may implement one or more of the components of FIG. 2. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a personal digital assistant (PDA), or any machine capable of executing the instructions 916, sequentially or otherwise, that specify actions to be taken by machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory/storage 930, and I/O components 950, which may be configured to communicate with each other such as via a bus

902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 912 and processor 914 that may execute the instructions 916. The term "processor" is intended to include multi-core processor that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core process), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of processors 910 are examples of machine-readable media.

As used herein, "machine-readable medium" means a device able to store instructions 916 and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via coupling 982 and coupling 972 respectively. For example, the communication components 964 may include a network interface component or other suitable device to interface with the network 980. In further examples, communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF416, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to devices 970. The term "transmission medium" shall be taken to include any intangible medium that is capable of storing, encoding, or carrying instructions 916 for execution by the machine 900, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
   a machine-readable medium storing computer-executable instructions; and
   at least one hardware processor communicatively coupled to the machine-readable medium that, when the computer-executable instructions are executed, is configured to:
   define a plurality of skill nodes, where at least one skill node corresponds to a skill associated with a first member profile of a social graph stored in a social graph database, wherein:
   the social graph comprises:

a plurality of member vertices, wherein a member vertex selected from the plurality of member vertices corresponds to the first member profile; and a plurality of edges between the member vertices, wherein each edge represents a connection; and establish a plurality of skill node pairings, where at least one skill node pairing includes a first skill node selected from the plurality of skill nodes and a second skill node selected from the plurality of skill nodes;

determine a plurality of graph edge values for the plurality of skill nodes pairings, where:

at least one graph edge value is determined based on the skill associated with the first member profile; and the at least one graph edge value is associated with the at least one skill node pairing;

determine a path from a starting skill node selected from the first plurality of skill nodes to a target skill node selected from the first plurality of skill nodes using at least one graph edge value selected from the plurality of graph edge values, wherein:

the starting skill node corresponds to a skill associated with a second member profile;

the target skill node corresponds to a skill associated with a job profile; and the path comprises a second plurality of skill nodes selected from the first plurality of skill nodes and minimizes a number of skill nodes traversed between the starting skill node and the target skill node; and communicate one or more portions of the determined path to a second member corresponding to the second member profile.

2. The system of claim 1, wherein the plurality of skill nodes are defined from a plurality of skills associated with a plurality of member profiles that correspond to the plurality of member vertices.

3. The system of claim 1, wherein the plurality of skill node pairings include at least one skill node pairing determined from a plurality of skills associated with the first member profile.

4. The system of claim 1, wherein the at least one graph edge value is further determined from a plurality of member profiles being associated with the skill associated with the first member profile.

5. The system of claim 1, wherein the at least one graph edge value is further determined from a plurality of member profiles being associated with each skill of a skill node pairing.

6. The system of claim 1, wherein the determined path is a minimum distance value path starting at the starting skill node and ending at the target skill node.

7. The system of claim 1, wherein the one or more portions of the determined path communicated to the second member include at least one intermediary skill corresponding to an intermediary skill node, the intermediary skill node being on the determined path and between the starting skill node and the target skill node.

8. A method comprising:

defining, by at least one hardware processor, a plurality of skill nodes, where at least one skill node corresponds to a skill associated with a first member profile of a social graph stored in a social graph database, wherein: the social graph comprises:

a plurality of member vertices, wherein a member vertex selected from the plurality of member vertices corresponds to the first member profile; and a plurality of edges between the member vertices, wherein each edge represents a connection; and establishing, by the at least one hardware processor, a plurality of skill node pairings, where at least one skill node pairing includes a first skill node selected from the plurality of skill nodes and a second skill node selected from the plurality of skill nodes;

determining, by the at least one hardware processor, a plurality of graph edge values for the plurality of skill nodes pairings, where:

at least one graph edge value is determined based on the skill associated with the first member profile; and the at least one graph edge value is associated with the at least one skill node pairing;

determining, by the at least one hardware processor, a path from a starting skill node selected from the first plurality of skill nodes to a target skill node selected from the first plurality of skill nodes using at least one graph edge value selected from the plurality of graph edge values, wherein:

the starting skill node corresponds to a skill associated with a second member profile;

the target skill node corresponds to a skill associated with a job profile; and the path comprises a second plurality of skill nodes selected from the first plurality of skill nodes and minimizes a number of skill nodes traversed between the starting skill node and the target skill node; and communicating, by the at least one hardware processor, one or more portions of the determined path to a second member corresponding to the second member profile.

9. The method of claim 8, wherein the plurality of skill nodes are defined from a plurality of skills associated with a plurality of member profiles that correspond to the plurality of member vertices.

10. The method of claim 8, wherein the plurality of skill node pairings include at least one skill node pairing determined from a plurality of skills associated with the first member profile.

11. The method of claim 8, wherein the at least one graph edge value is further determined from a plurality of member profiles being associated with the skill associated with the first member profile.

12. The method of claim 8, wherein the at least one graph edge value is further determined from a plurality of member profiles being associated with each skill of a skill node pairing.

13. The method of claim 8, wherein the determined path is a minimum distance value path starting at the starting skill node and ending at the target skill node.

14. The method of claim 8, wherein the one or more portions of the determined path communicated to the second member include at least one intermediary skill corresponding to an intermediary skill node, the intermediary skill node being on the determined path and between the starting skill node and the target skill node.

15. A machine-readable medium having computer-executable instructions stored thereon that, when executed by at least one hardware processor, cause the at least one hardware processor to perform a plurality of operations, the operations comprising:

defining a plurality of skill nodes, where at least one skill node corresponds to a skill associated with a first member profile of a social graph stored in a social graph database, wherein:
the social graph comprises:
a plurality of member vertices, wherein a member vertex selected from the plurality of member vertices corresponds to the first member profile; and
a plurality of edges between the member vertices, wherein each edge represents a connection; and
establishing a plurality of skill node pairings, where at least one skill node pairing includes a first skill node selected from the plurality of skill nodes and a second skill node selected from the plurality of skill nodes;
determining a plurality of graph edge values for the plurality of skill node pairings, where:
at least one graph edge value is determined based on the skill associated with the first member profile; and
the at least one graph edge value is associated with the at least one skill node pairing;
determining a path from a starting skill node selected from the first plurality of skill nodes to a target skill node selected from the first plurality of skill nodes using at least one graph edge value selected from the plurality of graph edge values, wherein:
the starting skill node corresponds to a skill associated with a second member profile;
the target skill node corresponds to a skill associated with a job profile; and
the path comprises a second plurality of skill nodes selected from the first plurality of skill nodes and minimizes a number of skill nodes traversed between the starting skill node and the target skill node; and
communicating one or more portions of the determined path to a second member corresponding to the second member profile.

16. The machine-readable medium of claim 15, wherein the plurality of skill nodes are defined from a plurality of skills associated with a plurality of member profiles that correspond to the plurality of member vertices.

17. The machine-readable medium of claim 15, wherein the plurality of skill node pairings include at least one skill node pairing determined from a plurality of skills associated with the first member profile.

18. The machine-readable medium of claim 15, wherein the at least one graph edge value is further determined from a plurality of member profiles being associated with the skill associated with the first member profile.

19. The machine-readable medium of claim 15, wherein the at least one graph edge value is further determined from a plurality of member profiles being associated with each skill of a skill node pairing.

20. The machine-readable medium of claim 15, wherein the determined path is a minimum distance value path starting at the starting skill node and ending at the target skill node.

* * * * *